US012776315B2

(12) United States Patent
Wang et al.

(10) Patent No.: US 12,776,315 B2
(45) **Date of Patent: *Oct. 27, 2026**

(54) SYSTEMS AND METHODS FOR VOICE-BASED INITIATION OF CUSTOM DEVICE ACTIONS

(71) Applicant: GOOGLE LLC, Mountain View, CA (US)

(72) Inventors: Bo Wang, San Jose, CA (US); Venkat Kotla, Cupertino, CA (US); Chad Yoshikawa, Mountain View, CA (US); Chris Ramsdale, Mountain View, CA (US); Pravir Gupta, Los Altos, CA (US); Alfonso Gomez-Jordana, Mountain View, CA (US); Kevin Yeun, Mountain View, CA (US); Jae Won Seo, Mountain View, CA (US); Lantian Zheng, San Jose, CA (US); Sang Soo Sung, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 18/649,608

(22) Filed: Apr. 29, 2024

(65) Prior Publication Data

US 2024/0282306 A1 Aug. 22, 2024

Related U.S. Application Data

(63) Continuation of application No. 17/728,614, filed on Apr. 25, 2022, now Pat. No. 12,002,463, which is a (Continued)

(51) Int. Cl.

*G10L 15/22* (2006.01)
*G06F 3/16* (2006.01)

(Continued)

(52) U.S. Cl.

CPC .............. *G10L 15/22* (2013.01); *G06F 3/167* (2013.01); *G06F 16/634* (2019.01);

(Continued)

(58) Field of Classification Search

CPC ...................................................... G10L 15/22

See application file for complete search history.

(56) References Cited

U.S. PATENT DOCUMENTS 6,975,993 B1 12/2005 Keiller
8,805,683 B1 8/2014 Wiseman (Continued)

FOREIGN PATENT DOCUMENTS

CN 104731854 6/2015
CN 106062734 10/2016

(Continued)

OTHER PUBLICATIONS

Japanese Patent Office; Decision of Rejection issued in Application No. 2022-133277; 7 pages; dated Aug. 5, 2024.

(Continued)

*Primary Examiner* — Shaun Roberts

(74) *Attorney, Agent, or Firm* — Gray Ice Higdon

(57) ABSTRACT

Systems and methods for enabling voice-based interactions with electronic devices can include a data processing system maintaining a plurality of device action data sets and a respective identifier for each device action data set. The data processing system can receive, from an electronic device, an audio signal representing a voice query and an identifier. The data processing system can identify, using the identifier, a device action data set. The data processing system can identify a device action from device action data set based on content of the audio signal. The data processing system can then identify, from the device action dataset, a command (Continued)

associated with the device action and send the command to the for execution device for execution.

19 Claims, 6 Drawing Sheets

Related U.S. Application Data continuation of application No. 15/781,787, filed as application No. PCT/US2018/031454 on May 7, 2018, now Pat. No. 11,314,481.

(60) Provisional application No. 62/640,007, filed on Mar. 7, 2018.

(51) Int. Cl.
*G06F 16/632* (2019.01)
*G10L 15/18* (2013.01)
*G10L 15/26* (2006.01)
*G10L 15/30* (2013.01)
*G10L 15/08* (2006.01)

(52) U.S. Cl.
CPC ...... *G10L 15/1815* (2013.01); *G10L 15/1822* (2013.01); *G10L 15/26* (2013.01); *G10L 15/30* (2013.01); *G10L 2015/088* (2013.01); *G10L 2015/223* (2013.01)

(56) References Cited

U.S. PATENT DOCUMENTS 9,443,527 B1 9/2016 Watanabe et al.
10,096,319 B1 10/2018 Jin
10,528,977 B1 1/2020 Jogia
11,183,182 B2 11/2021 Wang et al.
11,314,481 B2 4/2022 Wang et al.
2005/0234779 A1 10/2005 Chiu
2008/0189110 A1 8/2008 Freeman et al.
2010/0169098 A1 7/2010 Patch
2011/0067059 A1 3/2011 Johnston et al.
2011/0224981 A1 9/2011 Miglietta et al.
2011/0271210 A1 11/2011 Jones et al.
2012/0005267 A1 1/2012 Chen et al.
2012/0036245 A1 2/2012 Dare et al.
2012/0094657 A1 4/2012 Gullapalli et al.
2013/0073294 A1 3/2013 Burns
2013/0132094 A1 5/2013 Lim
2014/0012587 A1 1/2014 Park
2014/0022051 A1 1/2014 Levien et al.
2014/0037075 A1 2/2014 Tewfik
2014/0142945 A1 5/2014 Fry
2014/0244712 A1 8/2014 Walters et al.
2015/0170664 A1 6/2015 Doherty et al.
2015/0185996 A1 7/2015 Brown et al.
2015/0186154 A1 7/2015 Brown et al.
2015/0186155 A1 7/2015 Brown et al.
2015/0186156 A1 7/2015 Brown et al.
2015/0348551 A1 12/2015 Gruber et al.
2016/0021485 A1 1/2016 Sallas et al.
2016/0070260 A1 3/2016 Levien et al.
2016/0111091 A1 4/2016 Bakish
2016/0171980 A1 6/2016 Liddell et al.
2016/0179462 A1 6/2016 Bjorkengren
2016/0180853 A1 6/2016 VanLund et al.
2016/0210363 A1 7/2016 Rambhia et al.
2016/0217790 A1 7/2016 Sharifi
2016/0327942 A1 11/2016 Nixon et al.
2016/0345412 A1 11/2016 Aggarwal et al.
2017/0076749 A1 3/2017 Kanevsky et al.
2017/0092278 A1 3/2017 Evermann et al.
2017/0093952 A1 3/2017 Kumar et al.
2017/0110130 A1 4/2017 Sharifi et al.
2017/0110144 A1 4/2017 Sharifi et al.
2017/0132019 A1 5/2017 Karashchuk et al.
2017/0133011 A1 5/2017 Chen et al.
2017/0242653 A1 8/2017 Lang et al.
2017/0279971 A1 9/2017 Raleigh et al.
2017/0358301 A1 12/2017 Raitio et al.
2017/0366587 A1 12/2017 Sharifi et al.
2018/0061419 A1 3/2018 Melendo Casado et al.
2019/0103103 A1 4/2019 Ni et al.
2019/0147861 A1 5/2019 Zhang
2022/0244910 A1 8/2022 Wang et al.

FOREIGN PATENT DOCUMENTS

CN 107113469 8/2017
CN 107507614 12/2017
EP 0911808 4/1999
EP 1054391 11/2000
EP 1073037 1/2001
JP 2001014134 1/2001
JP 2001042884 2/2001
JP 2005031856 2/2005
JP 2006221270 8/2006
JP 2014122978 7/2014
JP 2014170185 9/2014
WO 2019172948 9/2019

OTHER PUBLICATIONS

Japanese Patent Office; Notice of Reasons for Rejection issued in Application No. 2022-133277; 11 pages; dated Feb. 26, 2024.
Japanese Patent Office; Notice of Reasons for Rejection issued in Application No. 2022-133277; 9 pages; dated Sep. 25, 2023.
China National Intellectual Property Administration; Grant Notice issued in Application No. 201880028784.5; 4 pages; dated Oct. 18, 2023.
European Patent Office; Brief Communication issued in Application No. 18727937.7; 1 page; dated Dec. 11, 2023.
Korean Intellectual Property Office; Notice of Office Action issued for Application No. 10-2023-7011704, 7 pages, dated Dec. 11, 2024.
European Patent Office; Minutes of Oral Proceedings issued for Application No. 18727937.7, 5 pages, dated Dec. 19, 2023.
European Patent Office; Decision to Refuse issued for Application No. 18727937.7, 18 pages, dated Dec. 21, 2023.
Intellectual Property India; Hearing Notice issued in Application No. 202027043204; 3 pages; dated Apr. 21, 2023.
China National Intellectual Property Administration; Notification of Second Office Action issued in Application No. 201880028784.5; 22 pages; dated Jun. 15, 2023.
The Korean Intellectual Property Office; Notice of Office Action issued in Application No. 10-2020-7028683, 6 pages, dated Jul. 18, 2022.
China National Intellectual Property Administration; Notification of First Office Action issued in Application No. 201880028784.5; 29 pages; dated Nov. 16, 2022.
The Korean Intellectual Property Office; Notice of Allowance issued in Application No. 1020207028683; 5 pages; dated Jan. 6, 2023.
European Patent Office; Summons to attend oral proceedings issued in Application No. 18727937.7; 8 pages; dated Jun. 29, 2023.
Purcher, Jack, Today Google Home's Virtual Assistant can learn its Owner's voice for Security Reasons like Apple's Patent Pending Idea, 4 pages; dated Apr. 20, 2017.
Sablich, Justin, "Planning a Trip With the Help of Google Home", New York Times, 6 pages; dated May 31, 2017.
Seifert, Dan, "Samsung's new virtual assistant will make using your phone easier", The Verge, 6 pages; dated Mar. 20, 2017.
Sherr, Ian, "IBM built a voice assistant for cybersecurity", cnet, 2 pages; dated Feb. 13, 2017.
Siegal, Daniel, IP Attys Load Up Apps' Legal Challenges at 'Silicon Beach', Law360, Los Angeles, California, 4 pages; dated Feb. 2, 2017.
Unknown Author, "'Dolphin' attacks fool Amazon, Google voice assistants", BBC News, 8 pages; dated Sep. 7, 2017.

(56) References Cited

OTHER PUBLICATIONS

Willens, Max, "For publishers, Amazon Alexa holds promise but not much money (yet)", Digiday, 6 pages; dated Jul. 6, 2017.
The Korean Intellectual Property Office; Notice of Office Action issued in Application No. 1020207028683; 34 pages; dated Dec. 27, 2021.
Japanese Patent Office; Notice of Reasons for Rejection issued in Application No. 2020-546986; 6 pages; dated Dec. 13, 2021.
Intellectual Property India: Examination Report issued for Application No. 202027043204 dated Aug. 1, 2021. 6 pages.
European Patent Office; Communication Pursuant to Article 94(3) EPC issued in Application No. 18727937.7; 8 pages; dated Oct. 21, 2021.
International Search Report and Written Opinion for PCT/US2018/031454 mailed Dec. 17, 2018.
Walmart and Google to offer voice-enabled shopping, BBC News, 10 pages; dated Aug. 23, 2017.
Abrams, Help users find, interact & re-engage with your app on the Google Assistant, Google Developers Blog, 16 pages; dated Nov. 15, 2017.
Albrecht, "Alexa, How Can You Be Used in Restaurants?", the spoon, 6 pages; dated Dec. 10, 2017.
Amazon, "Echo Look Hands-Free Camera and Style Assistant", reprinted from https://www.amazon.com/gp/product/B0186JAEWK?ref%5F=cm%5Fsw%5Fr%5Ffa%5Fdp%5Ft2%5F C5oazbJTKCB18&pldnSite=1; 7 pages; dated Aug. 22, 2017.
Barr, "AWS DeepLens—Get Hands-On Experience with Deep Learning With Our New Video Camera", AWS News Blog, 11 pages; dated Nov. 29, 2017.
Broussard, Mitchel, "Chatbot-Like Siri Patent Includes Intelligent Image, Video, and Audio Recognition within Messages", MacRumors, 7 pages; dated May 11, 2017.
Buckland et al., "Amazon's Alexa Takes Open-Source Route to Beat Google Into Cars", Bloomberg, 6 pages; dated Feb. 27, 2018.
Chen, Lulu Yilun, "Alibaba Challenges Google, Amazon With New Echo-Like Device", Bloomberg Technology, 3 pages; dated Jul. 5, 2017.
Clover, Juli, "Amazon and Google Want to Turn Their Smart Home Speakers Into Telephone Replacements", MacRumors, 5 pages; dated Feb. 15, 2017.
Coberly, "Apple patent filing reveals potential whispering Siri functionality", Techspot, 4 pages; dated Dec. 14, 2017.
Collins, et al., "Can Twitter Save Itself?", cnet, Apr. 26, 2017, reprinted from https://www.cnet.com/news/twitter-q1-2017-earnings/; 2 pages; reprint date Aug. 22, 2017.
Crist, Ry, "Logitech Harmony's Alexa Skill just got a whole lot better", cnet, 2 pages; dated Jul. 13, 2017.
Estes, "Amazon's Newest Gadget Is a Tablet That's Also an Echo", Gizmodo, 3 pages; dated Sep. 19, 2017.
Foghorn Labs, 10 Tips to Improve the Performance of Google Product Listing Ads, 5 pages; printed from Internet address: http://www.foghornlabs.com/2012/11/21/product-listing-ads-best-practices/, on Mar. 18, 2013.
Forrest, Conner, "Essential Home wants to be bridge between Amazon's Alexa, Apple's Siri, and Google Assistant", TechRepublic, 10 pages; dated May 31, 2017.
Foxx, Chris, "Apple reveals HomePod smart speaker", BBC News, 6 pages; dated Jun. 5, 2017.
Gebhart, Andrew, "Google Assistant is spreading, but it needs its own Echo Dot", cnet, 7 pages; dated May 20, 2017.
Gebhart, Andrew, Google Home to the Amazon Echo: 'Anything you can do . . . ', cnet, 7 pages; dated May 18, 2017.
Gibbs, Samuel, "Your Facebook Messenger app is about to be filled with ads", The Guardian, 3 pages; dated Jul. 12, 2017.
Golgowski, Nina, "This Burger King Ad Is Trying to Control Your Google Home Device", Huffpost, 7 pages; dated Apr. 12, 2017.
Google Developers, "GoogleAssistant SDK", 4 pages; reprinted from https://developers.google.com/assistant/sdk/ on Aug. 22, 2017.
Google Inc., Products Feed Specification, 6 pages; printed from Internet address: http://www.support.google.com/merchants/bin/answer.py?h1=en&answer=188494#US on Mar. 18, 2013.
Google Inc., Supported File Formats, 1 page; printed from Internet address: http://www.support.google.com/merchants/bin/answer.py?h1=en&answer=160567 on Mar. 18, 2013.
Gurman, et al., "Apple Is Manufacturing a Siri Speaker to Outdo Google and Amazon", Bloomberg, 5 pages; dated May 31, 2017.
Hardwick, Tim, "Facebook Smart Speaker Coming Next Year With 15-inch Touch Panel", MacRumors, 5 pages; dated Jul. 25, 2017.
Heater, "Amazon Alexa devices can finally tell voices apart", TechCrunch, 6 pages; dated Oct. 11, 2017.
Johnston, "Amazon Whirlwind: New Echo, Plus, Spot, Connect, Fire TV Take The Stage", Twice, 4 pages; dated Sep. 27, 2017.
Kelion, "Amazon revamps Echo smart speaker family", BBC News, 11 pages; dated Sep. 27, 2017.
Kelion, Leo, "Amazon's race to make Alexa smarter", BBC News, 8 pages; dated Jul. 28, 2017.
Koetsier, John, "Ads on Amazon Echo: Wendy's, ESPN, and Progressive Among Brands Testing", Forbes, 2 pages; dated May 11, 2017.
Krishna, "Jim Beam's smart decanter will pour you a shot when you ask", engadget, 3 pages; dated Nov. 29, 2017.
Lacy, "Improving search and advertising are the next frontiers for voice-activated devices", TechCrunch, 13 pages; dated Dec. 20, 2017.
Larson, Selena, "Google Home now recognizes your individual voice", CNN Money, San Francisco, California, 3 pages; dated Apr. 20, 2017.
Lee, Take Two for Samsung's troubled Bixby assistant, BBC News, 6 pages; dated Oct. 19, 2017.
Lee, Dave, "The five big announcements from Google I/O", BBC News, 9 pages; dated May 18, 2017.
Lund, Pamela, Mastering Google Product Feeds and Product Listing Ads $2013 Part 1, found at http://www.blueglass.com/blog/mastering-google-product-feeds-and-product-listing-ads-part-1/#comments, 17 pages; dated Dec. 28, 2013.
Nieva, Richard, "Google Home and eBay can tell you how much that's worth", cnet, 3 pages; dated Mar. 8, 2017.
Novet, et al., "Amazon is getting ready to bring Alexa to work", CNBC,4 pages; dated Nov. 29, 2017.
Palladino, "Garmin teamed up with Amazon to make a tiny Echo Dot for your car", ars Technica, 2 pages; dated Oct. 17, 2017.
Patently Apple, "Apple Patent Reveals a New Security Feature Coming to Siri", Apr. 4, 2017, 6 pages; reprinted from http://www.patentlyapple.com/patently-apple/2017/04/apple-patent-reveals-a-new-security-feature-coming-to-siri.html on Aug. 22, 2017.
Patently Mobile, "The Patent behind Google Home's new Feature of Understanding Different Voices in the Home Surfaced Today", Apr. 20, 2017, 3 pages; reprinted from http://www.patentlymobile.com/2017/04/the-patent-behind-goog le-homes-new-feature-of-understanding-different-voices-in-the-home-surfaced-today.html, Aug. 22, 2017.
Perez, "Alexa's 'Routines' will combine smart home control with other actions, like delivering your news and weather", TechCrunch, 10 pages; dated Sep. 28, 2017.
Perez, Sarah, "The first ad network for Alexa Skills shuts down following Amazon's policy changes", Tech Crunch, 6 pages; dated Jun. 15, 2017.
Porter, Jon, "Amazon Echo Show release date, price, news and features", Techradar, 14 pages; dated Jun. 26, 2017.
Pringle, "'I'm sorry to hear that': Why training Siri to be a therapist won't be easy", CBC News, 3 pages; dated Sep. 24, 2017.
Japanese Patent Office; Notice of Allowance issued in app. No. 2020-546986, 3 pages, dated Jul. 25, 2022.

SYSTEMS AND METHODS FOR VOICE-BASED INITIATION OF CUSTOM DEVICE ACTIONS

BACKGROUND

Digital virtual assistants (DVAs) can interact with client devices. For instance, users of the client devices can initiate online tasks, e.g., an online search or an online transaction, via voice-based or chat-based queries. DVAs can allow for hands-free interactions with client devices.

SUMMARY

According to at least one aspect of the disclosure, a data processing system to enable voice-based interactions with client devices can comprise a communications interface, a memory, a device action customization component, and a natural language processor component. The communications interface can receive, from a computing device, device action data and an identifier associated with the device action data. The device action data can be indicative of a plurality of device actions supported by a plurality of client devices and a plurality of device executable commands. Each device executable command of the plurality of device executable commands can be configured to trigger execution of a corresponding device action of the plurality of device actions. The memory can store the device action data. The device action customization component van map the device action data to the identifier. The communications interface can receive, from a client device of the plurality of client devices, an audio signal and the identifier. The audio signal can be obtained by the client device responsive to a voice-based query. The natural language processor component can identify, using the identifier and content associated with the audio signal, a device action of the plurality of device actions supported by the plurality of client devices. The device action customization component can identify a device executable command of the plurality of device executable commands corresponding to the device action. The communications interface can transmit, to the client device, the device executable command for execution responsive to the voice-based query to cause performance of the device action.

At least one aspect of the disclosure relates to a method of enabling voice-based interactions with client devices. The method can include a data processing system receiving, from a computing device, device action data and an identifier associated with the device action data. The device action data can be indicative of a plurality of device actions supported by a plurality of client devices and a plurality of device executable commands. Each device executable command of the plurality of device executable commands can trigger execution of a corresponding device action of the plurality of device actions. The method can include the data processing system storing the device action data in a memory. The method can include the data processing system mapping the device action data to the identifier. The method can include the data processing system receiving, from a client device of the plurality of client devices, an audio signal and the identifier. The audio signal can be obtained by the client device responsive to a voice-based query. The method can include the data processing system identifying, using the identifier and content associated with the audio signal, a device action of the plurality of device actions supported by the plurality of client devices. The method can include the data processing system identifying a device executable command of the plurality of device executable commands corresponding to the device action. The method can include the data processing system transmitting, to the client device, the device executable command for execution responsive to the voice-based query to cause performance of the device action.

According to at least one aspect of the disclosure, there is provided an electronic device to support voice-based interactions. The electronic device can include an audio receiver, a communications interface, and a command execution component. The audio receiver can generate an audio signal corresponding to an input voice-based query. The electronic device can be associated with device action data maintained by a remote data processing system and an identifier of the device action data. The device action data can include a plurality of device actions and a plurality of device executable commands that are supported by electronic devices associated with the device action data. Each device executable command can be configured to trigger execution of a corresponding device action of the plurality of device actions. The communications interface can transmit, responsive to the voice-based query, the identifier and the audio signal to the remote data processing system. The remote data processing system can maintain one or more data structures mapping the identifier to the plurality of device actions and the plurality of device executable commands. The communications interface can receive, from the remote data processing system, responsive to transmission of the audio signal, a device executable command of the plurality of device executable commands. The device executable command can be identified by the data processing system based on the identifier, the audio signal, and the one or more data structures. The command execution component can be configured to execute the device executable command to perform the device action.

According to at least one aspect of the disclosure, there is provided a method of supporting voice-based interactions. The method can include an electronic device generating an audio signal corresponding to an input voice-based query. The electronic device can be associated with device action data maintained by a remote data processing system and an identifier of the device action data. The device action data can include a plurality of device actions and a plurality of device executable commands that are supported by electronic devices associated with the device action data. Each device executable command can be configured to trigger execution of a corresponding device action of the plurality of device actions. The method can include the electronic device transmitting, responsive to the voice-based query, the identifier and the audio signal to the remote data processing system. The remote data processing system can maintain one or more data structures mapping the identifier to the plurality of device actions and the plurality of device executable commands. The method can include the electronic device receiving, from the remote data processing system, a device executable command of the plurality of device executable commands responsive to transmission of the audio signal. The device executable command can be identified by the data processing system based on the identifier, the audio signal, and the one or more data structures. The method can include the electronic device executing the device executable command to perform the device action.

According to at least one aspect of the disclosure, there is provided a data processing system to provide content responsive to voice-based interactions. The data processing system can include a memory, a device action customization component, a communications interface, and a natural language processor component, and a content selector component. The memory can store device action data including a plurality of device action-command pairs supported by a plurality of electronic devices. Each device action-command pair can include a respective device action of a plurality of device actions and a respective device executable command of a plurality of device executable commands to trigger performance of the respective device action. The device action customization component can map an identifier to each of the plurality of device action-command pairs supported by the plurality of electronic devices. The communications interface can receive, from an electronic device, the identifier and signal obtained by the electronic device responsive to a voice-based query. The natural language processor component can identify, using content associated with the audio signal and the identifier, a device action-command pair of the plurality of device action-command pairs. The device action customization component can identify a context of the voice-based query based on the device action data or the device-command pair. The content selector component can select a digital component based on the context of the voice-based query. The communications interface can transmit the digital component and a device executable command associated with the device action-command pair to the electronic device. The device executable command, when executed, can cause performance of the device action associated with the device action-command pair, and the digital component can be presented (or rendered) by the electronic device.

According to at least one aspect of the disclosure, there is provided a method of providing content to responsive to voice-based interactions. The method can include a data processing system storing, in a memory, device action data including a plurality of device action-command pairs supported by a plurality of electronic devices. Each device action-command pair can include a respective device action of a plurality of device actions and a respective device executable command of a plurality of device executable commands to trigger performance of the respective device action. The method can include a data processing system mapping an identifier to each of the plurality of device action-command pairs supported by the plurality of electronic devices. The method can include a data processing system receiving, from an electronic device, the identifier and an audio signal obtained by the electronic device responsive to a voice-based query. The method can include a data processing system identifying, using content associated with the audio signal and the identifier, a device action-command pair of the plurality of device action-command pairs. The method can include a data processing system identifying a context of the voice-based query based on the device action data or the device-command pair. The method can include a data processing system selecting a digital component based on the context of the voice-based query. The method can include a data processing system transmitting the digital component and a device executable command associated with the device action-command pair to the electronic device. The device executable command to cause performance of the device action can be associated with the device action-command pair and the digital component can be presented by the electronic device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
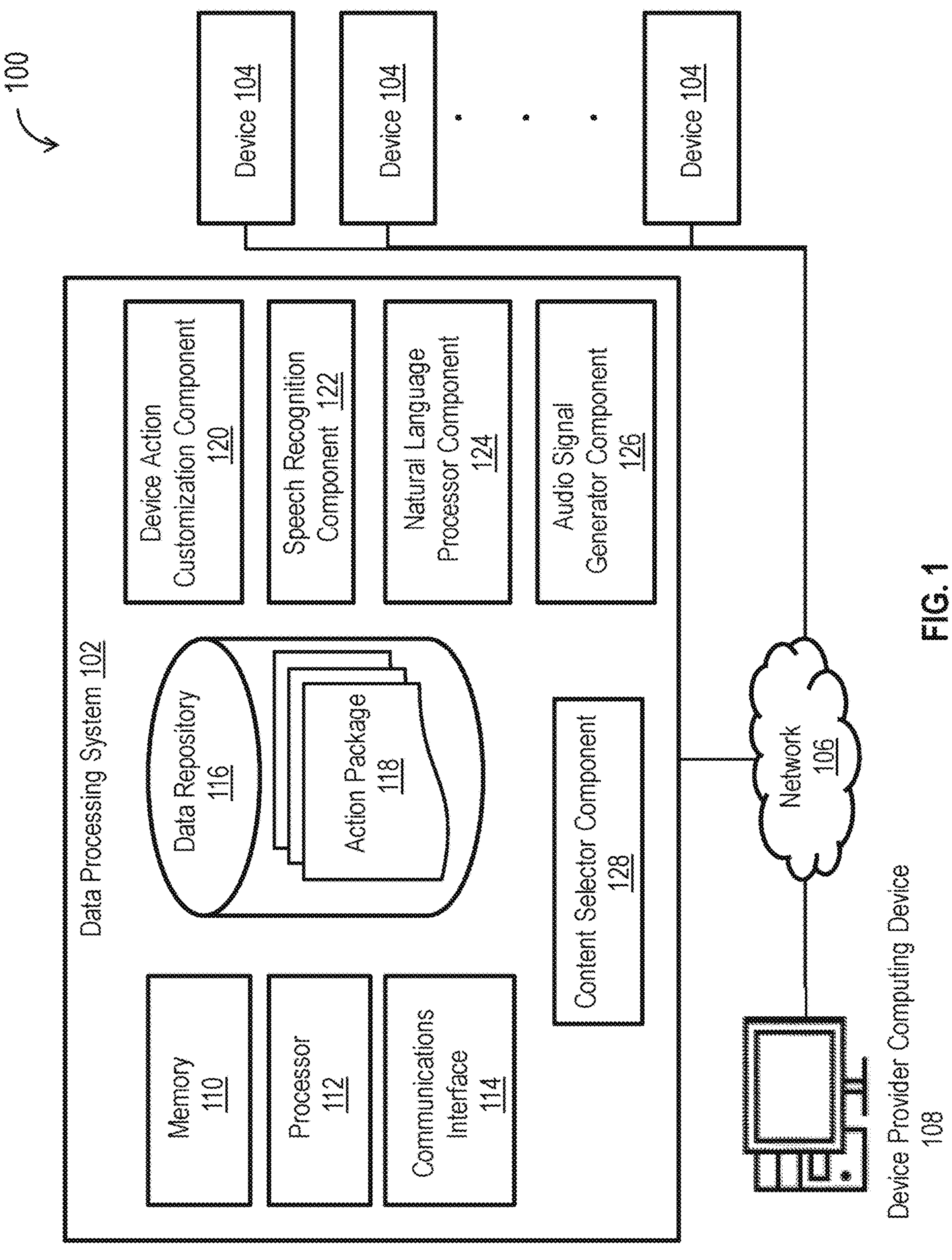
FIG. 1 illustrates an example system to enable electronic devices with voice-based interaction capabilities and customized digital virtual assistant (DVA) functionalities.

Following below are more detailed descriptions of various concepts related to, and implementations of, methods, apparatuses, and systems for enabling audio-based (or chat-based) interactions with second-party devices, third-party applications, or a combination thereof. The various concepts introduced above and discussed in greater detail below may be implemented in any of numerous ways.

Digital virtual assistants (DVA) can be integrated into an online platform to allow for voice-based (audio-based) or chat-based interactions with client devices associated with the online platform. For instance, users of the client devices can initiate online tasks, e.g., an online search or an online transaction, via voice-based or chat-based queries. The DVA can interpret the voice-based or chat-based queries and initiate online actions requested in the voice-based or chat-based queries. In general, the client devices with DVA capabilities can also engage in audio conversations with respective users to fulfill users' queries. The DVA capabilities of conducting meaningful conversations with users and accurately serving users' voice-based queries add significant value to the corresponding client devices as they significantly enhance user experience. In particular, DVAs allow for hands-free interactions with client devices. In addition, with accurate interpretations of voice-based or chat-based input and meaningful responses, the DVAs humanize users' interactions with client devices by allowing for sensible user-device conversations.

A DVA can be integrated in an online platform and corresponding client devices to allow for chat-based or voice-based interactions with the corresponding client devices. For instance, a DVA client (or DVA software agent) can be integrated in an operating system (OS) of mobile devices or smart home devices capable of communicating with one or more remote servers implementing DVA functionalities. The OS and the one or more servers implementing DVA functionalities can be provided by the same entity or provider, referred to herein as a first-party provider. Such integration approach suggests that a second-party device provider (e.g., an original equipment manufacturer (OEM), device maker, or device vendor) different from a first-party provider providing the DVA can either implement his own DVA or adopt an OS with a DVA agent integrated therein to enable respective second-party devices to support functionalities and services associated with the DVA. Both options impose limitations or barriers to the expansion of the DVAs across a wide range of second-party devices. These limitations and barriers also apply to expanding the use of DVAs to enable voice-based interactions with third-party applications (e.g., mobile applications or client applications) implemented by a third-party provider (e.g., different from the first-party and second-party providers) to run on first-party or second-party devices.

For second-party device providers, modifying an existing OS or adopting a new OS that integrates a DVA client can be disruptive, technically cumbersome, and costly. Even if no changes are to be made to the OS, using an existing DVA of a respective first-party provider may involve providers of second-party devices maintaining a cloud presence (e.g., via cloud servers) to communicate with the DVA platform or DVA servers and serve the respective second-party devices. Also, using an existing DVA of a respective first-party provider leaves the providers second-party devices with little flexibility, if any, for customization to differentiate voice-based interactions with their devices or provide a differentiated experience to their customers over competitors. For instance, the scope and range of vocabulary used in voice-based interactions with a given second-party device can be relatively narrow and specific (e.g., compared to the scope and range of vocabulary used in voice-based interactions with other devices). Specifically, each device (e.g., of a given type or model) may support a corresponding specific set of device actions that may be different from device actions supported by other devices. Since user interactions with a device usually involve triggering corresponding device actions, using a narrow vocabulary scope defining device actions supported by a given type or model of devices can help a DVA system better serve devices of the given type or model. The DAV system can improve its accuracy in interpreting voice-based queries and providing sensible responses to such queries. As used herein, a DVA system refers to a data processing system providing server-side DVA functionalities.

Similar limitations and barriers also apply with regard to expanding the use of DVA-based services or capabilities (e.g., voice-based or chat-based interactions) to third-party applications. Third-party applications can include mobile applications, client applications or other applications developed by third-party developers. As used herein, a third-party is an entity (e.g., application developer) different from the entity providing the DVA system (also referred to herein as the first party) and the entity (also referred to herein as the second party) providing the device on which the application may execute or run. A third-party application may not be originally installed on the device at the manufacturing or development stages, but rather downloaded and installed (or even developed) after the device is sold on the market. Even if the device supports a DVA client, the third-party application running on the device may not be able to employ functionalities of the DVA, for example, to allow for voice-based interactions with the third-party application or content thereof.

In the current disclosure, a self-service approach can allow second-party device providers or third-party application providers to enable voice-based (or chat-based) interactions to trigger respective custom actions. A second-party device provider can build or define a bundle (or an action package) of custom device actions supported by a respective group of devices (e.g., devices of a given type, category or model), and provide the bundle (or action package) to a DVA system. Each bundle of custom device actions can include (or specify) one or more device actions supported by a respective group of devices and one or more corresponding device executable commands. Each device action in a bundle of custom device actions can be associated with a corresponding device executable command for executing (or causing performance of) that device action on any device of the respective group of devices. The bundle of custom device actions may also include (or specify), for each respective device action, a corresponding response (e.g., audio, visual or audio-visual response) to be provided for presentation on any device of the respective group of devices in connection with execution of that device action.

The DVA system can maintain each bundle of custom device actions in association with a respective identifier. The identifier can be a device model identifier (ID) indicative of a device model of the group of devices associated with the bundle of custom device actions, an identifier of the second-party device provider, a bundle ID, a directory ID of a directory under which the bundle of custom device actions is maintained, or a combination thereof. The second-party device provider can provide the identifier to the DVA system with the bundle of custom device actions. The process of providing the bundle of custom device actions and the identifier to the DVA system can be viewed as a registration of the corresponding device group of devices (or the corresponding device model) with the DVA system. Registering the device model (or the group of dives) may also include providing indications of properties, characteristics, features, or capabilities of the group of devices (e.g., associated with the device model), other metadata associated with the group of devices or the device model, or a combination thereof. The DVA system (or the first-party provider thereof) can allow a second-party device provider to register a device model (or a group of devices) with the DVA system, for example, via a user interface (UI), a web interface, or a restful application programming interface (API). The first-party provider, or the DVA system may validate (or certify) the device model (or the group of devices) upon, for example, successful testing of the device executable commands provided in the bundle of custom device actions.

Similarly, a third-party application provider can build or define a bundle (or package) of custom application actions supported by a respective application and provide the bundle (or package to the DVA system. The bundle of custom application actions can include one or more actions supported by the application and one or more corresponding application executable commands. Each custom application action can be associated with a corresponding application executable command for casing the application to execute that custom application action. Similar to the bundles of custom device actions, the DVA system can maintain each bundle of custom application actions in association with a respective identifier. The identifier can be an application ID, a third-party application provider ID, a bundle ID, or directory ID indicative of a directory (or a project) under which the bundle of custom application actions is maintained.

The first-party provider or the DVA system can provide one or more software development kits (SDKs) for integration second-party devices or third-party application to allow voice-based user interactions. The first-party provider can provide separate SDKs for second-party devices and third-party applications. The SDK(s), when integrated in second-party devices or third-party applications, can provide software tools for activating audio receivers (e.g., a microphone), initiating conversations, initiating communication sessions with the DVA system, sending requests to and receiving responses from the DVA system, parsing responses received from the DVA system, or a combination thereof. Also, a second-party device provider or a third-party application provider can build an on-device action handler to perform on-device execution of the device executable commands or the application executable commands.

A second-party device (e.g., associated with a registered device group or device model) can receive a voice-based query from a respective user, and generate an audio signal corresponding to the voice-based query. The second-party device can transmit the audio signal together with the identifier associated with a respective action package (e.g., the device model ID) to the DVA system. The DVA system can identify a device action among the device actions listed in the respective action package of custom device actions based on the audio signal and the identifier. In identifying the device action, the DVA system can assign different weights to expressions or query patterns indicative of actions listed in the respective action package. The DVA system can apply a contextual device action matching and ranking mechanism with a contextual speech biasing for query patterns indicative of device actions supported by the device model. For instance, in matching the received audio signal to a query pattern of a plurality of query patterns, the DVA system can apply a bias to query patterns associated with (or indicative of) device actions supported by the device model.

The DVA system can retrieve the device executable command associated with the identified device cation, and send the device executable command to the second-party device for execution. The DVA system can also retrieve the response associated with the identified device cation, and send an audio version of the response to the second-party device for presentation (or playing) to the user prior to, during, or after execution of the device action requested in the voice-based query. Upon the second-party device receiving the device executable command, the on-device action handler can extract or retrieve the device executable command from the communication received from the DVA system, and cause the second-party device to execute the device executable command to perform the device action requested in the voice-based query. The second-party device can play any audio, visual, or audiovisual response (received from the DVA system) prior to, during, or after execution of the device action.

A third-party application (e.g., with SDK integrated therein and running on a device) can provide an interactive user interface (UI) component for presentation on a display of the device. A user of the device can, for example, interact (e.g., by clicking, touching, or swiping) with the interactive UI component to start a conversation with the third-party application. Upon receiving a voice-based query from a the user, the application can generate an audio signal corresponding to the voice-based query, and transmit the audio signal together with an identifier associated with a respective action package (e.g., application ID, action package ID, directory ID) to the DVA system. The DVA system can identify an application action among the custom application actions listed in the respective action package based on the audio signal and the identifier. In identifying the device action, the DVA system can assign different weights to expressions or query patterns indicative of actions listed in the respective action package. The DVA system can apply a contextual device action matching and ranking mechanism with a contextual speech biasing for query patterns indicative of application actions supported by the third-party application. The DVA system can identify a command associated with the application action and transmit the command to the device for execution buy the third-party application.

The DVA system can also identify a context of the voice based query using the identifier, the identified device or application action, an identifier of the device, or a combination thereof. Identifying the context of the voice based query can include identifying the user intent behind the voice-based query. The DVA system can select a digital component, such as a third-party digital component (e.g., an advertisement) based on the context of the voice-based query, and send the digital component to the device for presentation. The digital component can include audio content or audiovisual content. The digital component can include promotional content to suggest or offer services or products to the user. The device can present the digital component in a seamless way, such that it feels or appears to the user as part of a natural response to the voice-based query.

According to example embodiments of this disclosure, systems, methods, and devices described herein enable voice-based interactions with second-party devices or third-party applications by employing an on-device execution model of device actions without the second-party device providers or third-party application providers maintaining a cloud point to communicate with a DVA system associated with a first provider. The DVA system can receive audio queries from the second-party devices, and perform speech recognition and smart natural language processing to identify a requested device or application action. The DVA system can provide a response, e.g., a JSON response, indicative of device executable command to a second-party device triggering the second-party device to execute the requested device action. Also, according to example embodiment of this disclosure, a user may make voice-based queries to request performance of specific device actions or specific application actions without explicitly asking the device to invoke or talk to an agent.

In the following, a device action can refer to a custom device action or a custom application action. In fact, both custom device actions and custom application actions are executed by electronic (or client) devices. Also, an electronic (or client) device or system can refer to a device or system with electronic (or processing) capabilities to execute instructions or commands.

FIG. 1 illustrates an example system 100 to enable electronic devices and third-party applications with voice-based interaction capabilities and customized digital virtual assistant (DVA) functionalities. The system 100 can include a data processing system 102 and a plurality of client devices 104 communicatively coupled to the data processing system 102 via a communications network 106. The data processing system 102 and the client devices 104 can be associated with distinct or separate providers. The system 100 can include one or more computing devices 108 associated with providers of the client devices 104 or providers of third-party applications executable on the client devices 104 (e.g., second party devices). As used herein, a device provider can include the device maker or another entity that provides the client devices 104 to customers or users. A third-party application provider can include the application developer or another entity providing the application for consumption. The one or more computing devices 108 can be communicatively coupled to the data processing system 102 through the communications network 106. The communications network 106 can include the Internet, a wireless cellular network, a wired network, a local area network, a wide area network, a public network, a private network, or a combination thereof.

The data processing system 102 can include a memory 110 to store data or computer code instructions, one or more processors 112 to execute the computer code instructions, and a communications interface 114 to communicate with other systems or devices such as the client devices 104 or the computing devices 108. The data processing system 102 can include a data repository 116 for storing one or more action packages (or bundles) 118. The data processing system 102 can include an action customization component 120 for managing storage, access or processing of the action packages 118 or corresponding data. The data processing system 102 can include a speech recognition component 122 for converting audio signals to text, and a natural language processor (NLP) component 124 for determining the structure and meaning of text, such as text output provided by the speech recognition component 122. The data processing system 102 can include an audio signal generator component for converting text to corresponding audio (or audible) signals. The data processing system 102 can include a content selector component 128 for selecting content or digital components (also referred to herein as content items) for presentation on the client devices 104.

The data processing system 102 can include one or more computer servers (not shown in FIG. 1). For example, the data processing system 102 can include a plurality of logically-grouped servers (not shown in FIG. 1) that facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous-one or more of the servers or machines can operate according to one or more types of operating system platform. The data processing system 102 can include servers in a data center that are stored in one or more high-density rack systems, along with associated storage systems, located for example in an enterprise data center. The data processing system 102 with consolidated servers in this way can improve system manageability, data security, the physical security of the system, and system performance by locating servers and high-performance storage systems on localized high-performance networks. Centralization of all or some of the data processing system 102 components, including servers and storage systems, and coupling them with advanced system management tools allows more efficient use of server resources, which saves power and processing requirements and reduces bandwidth usage.

The client devices 104 can include a set of second-party devices having (or associated with) a device model, e.g., defined by the provider of the set of second-party devices. In general, the data processing system 102 can serve (or can be communicatively coupled to) a plurality of sets of second-party devices with each set of second-party devices having (or associated with) a respective device model or device type. The client devices 104 can include first-party or second-party devoices with third-party applications installed thereon. The client (or electronic) devices 104 can include robots, cars or other vehicles, appliances, home security systems, lighting control systems, cable boxes, smart televisions, media players, radio devices, smart alarm clocks, smart watches, mobile or hand-held devices (e.g., tablets, smart phones, or hand-held media players), video game consoles, medical imaging devices, fitness and exercising devices, or other devices with processing capabilities to execute instructions or commands and communications capabilities to communicate with the data processing system 102, e.g., via the network 106. A device model can be defined (or specified) by a device provider to define a set or group of devices of that provider sharing a respective set of features, properties, characteristics, or capabilities. Examples of device models can include car (or other vehicle models, appliances models (refrigerator models or stove models), home security system models, lighting control system models, cable box models, smart television models, media player models, radio device models, smart alarm clock models, smart watch models, smart phone models, tablet models, laptop models, video game console models, medical imaging device models or fitness and exercising device models. A device model can include a device model identifier (e.g., a device model name, a device model serial number, or a device model code). Second-party devices having a given device model can have device identifiers sharing a common portion. The common portion of the device identifiers can act as an identifier or indicator of the device model. A device provider can have multiple sets (or groups) of devices 104 with each set or group associated with a corresponding device model.

Second-party devices associated with a given device model (or device type or device category) can support a respective plurality of device actions. The respective plurality of device actions can represent actions that can be performed by the second-party devices having the given device model, and can be triggered by users of the second-party devices. For instance, device actions associated with robots of a given robot model can include, for example, moving left, moving right, moving forward, moving backward, or a combination thereof. Device actions supported by a home security system of a given security system model can include, for example, activating the away mode, activating the stay mode, switching to a specific camera (e.g., of a specific camera number), activating the alarm, deactivation the alarm, or a combination thereof. Device actions supported by a fitness and exercising device (e.g., a treadmill) of a given fitness and exercising device model can include, for example, activate/switching to cardio mode, activating/switching to fat burn mode, setting speed to a specific speed value, setting elevation to a specific elevation angle, or a combination thereof. Each device action of a given device model can be associated with a corresponding command (or device executable command) that triggers second-party devices having the given device model to execute that device action.

Also, a third-party application can support a respective plurality of device actions. The respective plurality of device actions can represent actions that can be performed by a client device 104 on which the third-party application is installed, and can be triggered by users of the third-party application or the client device. For example, device (or application) actions associated with an application for connecting drivers with riders can include, searching for a ride from a first location to a second location, selecting a ride from a list of rides, checking a current location of a driver, or a combination thereof. Device (or application) actions of a social network application can include opening a page (e.g., a friend's page), playing a media file shared by a friend, sharing a content item, responding to a post of a friend with input content, or a combination thereof. Device (or application) actions of a navigation application can include providing driving directions (or route) from a first location to a second location, providing traffic information along a route, searching for a facility (e.g., gas station, rest area, or restaurant) along a route, switching to an alternative route, or a combination thereof.

A third-party application provider or a second-party device provider can generate an action package 118 (e.g., a device action file or a device action script) that specifies device actions supported by a third-party application (or client devices 104 installing the third-party application) or, respectively, client devices 104 (e.g., second-party devices) associated with a device model. The action package 118 can list, for each device action, one or more query patterns to trigger the device action on a client device 104. For example, for a robot of a given robot model, the query patterns can include “move left” and “go left” for a moving left action, “move right” and “go right” for a moving right action, “move forward” and “go forward” for a moving forward action, “move backward” and “go backward” for a moving backward action, or a combination thereof. For home security system of a given security system model, the query patterns can include “activate away mode” and “switch to away mode” for an action of activating the away security mode, “activate stay mode” and “switch to stay mode” for an action of activating the stay security mode, “switch to camera CAMERA_NUMBER” for an action of switching to video content from a specific camera, “activate alarm” for an action of activating the alarm, “deactivate alarm” for an action of deactivating the alarm, or a combination thereof. For a fitness and exercising device (e.g., a treadmill) of a given fitness and exercising device model, the query patterns can include, for example, “activate cardio mode” and “switch to cardio mode” for the action of activating the cardiovascular mode, “activate fat burn mode” and “switch to fat burn mode” for the action of activating the fat burn mode. For a mobile device, example query patterns can include “open settings,” “open email,” “show me my reminders,” or a combination thereof. For an application for connecting drivers with riders, example queries can include “need ride from LOCATION1 to LOCATION2,” “go with RIDE,” or “show driver’s location.” Example queries for a social network application can include “opening FRIEND page,” “play video,” “share video,” or “comment to POST with CONTENT.” For a navigation application, corresponding queries can include “show me driving directions from LOCATION1 to LOCATION2,” “show me traffic information,” “show me FACILITIES,” or “switch to new route.”

The action package 118 may include an action name for each device action. The action package 118 may specify, for each device action, a respective device executable command (or application executable command) for triggering on-device execution of the device action. The action package 118 may specify, for each device action, a response to be presented by the client devices 104 in connection with execution of the device action. Each response can be described as a text expression that can be converted to audio for presentation by the client devices 104. The script below provides an illustration of an example script defining an action package for a smart cooker.

```
{
   "manifest" :{ ... },
   "actions" :[
      {
         "intent" :{
            "name":"com.smart_cooker.COOK_CAKE",
            "trigger" :{
               "queryPatterns":[
                  "bake a cake" ,
                  " cook a cake "
               ]
            }
         },
         "availability" :{
         "deviceAction" : true
         },
         "staticFulfillment" :{
            "textToSpeech": "Baking a cake" ,
            "deviceExecution":{
               "command" :"com.smart_cooker.command.COOK_CAKE"
            }
         }
      }
   ]
}
```

The script defines a single device action for cooking cake that is named “COOK_CAKE.” The script defines also defines query patterns “bake a cake” and “cook a cake” associated with the device action. The script defines a device executable command “command.COOK_CAKE” for executing the device action. Further, the script can define a response, e.g., “Baking a cake,” to be played, for example, in audio format by a client device 104 responsive to a voice query “bake a cake” or “cook a cake.”

A second-party device provider or a third-party application provider can use the computing device 108 to provide a corresponding action package and an identifier (ID) associated with the action package to the data processing system 102. For example, a second-party device provider can register a respective device model with the data processing system 102 via the computing device 108. The computing device 108 can include a desktop, laptop, smart phone, handheld device, or other computing device. The computing device 108 can transmit the action package 118 and device model data to the data processing system 102 as part of the registration of the device model. Device model data can include, for example, an indicator (or indication) of the device model (e.g., a device model identifier or a device model name), indications of properties, characteristics, features or capabilities of devices associated with the device model, a name of the corresponding second-party device provider, a description of devices associated with the device model, and indication of a device type, or a combination thereof. A third-party application provider can also use the computing device 108 to provide a respective action package (e.g., defining device actions supported by the application) and an ID associated with the action package (e.g., application ID, package ID, directory ID or project ID) to the data processing system 102. The data processing system 102 can provide a restful API or a UI for use by the computing device 108 to transmit action data, IDs, or other information to the data processing system 102. For instance, the UI can be associated with a webpage or an application provided by the data processing system 102 or the first-party provider. The computing device 108 can access the webpage or the application to allow filling in the device actions data, the device model data, application information data, or a combination thereof into, for example, corresponding text input slots of the UI. A restful API is an API that uses HTTP requests (e.g., GET, PUT, POST, or DELETE) to request, transfer, or delete data.

The script below provides an example illustration of data that can be provided by the computing device 108 to the data processing system 102 as part of registering a second-party device. The data relates to the smart cooker discussed with regard to the example action package provided above.

```
{
  "project_id": "my-smart-cooker",
  "device_model_id": "smart-cooker-v1",
  "manifest": {
    "manufacturer": "Smart Cooker Inc",
    "product_name": "Smart Cooker",
    "device_description": "Smart device for cooking"
  },
  "device_type": "action.devices.types.OTHER",
"actionConfig": {
    "supportedIntents": [
      "com.smart_cooker.intent.COOK_CAKE"
    ]
  }
}
```

The data in the script above specifies a device model ID, a manufacturer name, a product name, a device description, a device type, and a reference (e.g., “com.smart_cooker.intent.COOK_CAKE”) to an action package (e.g., the action package associated with the first script above). The computing device 108 can also transmit the action package, the identifier, and other information associated with the second-party device (or third-party application) either separately or together to the data processing system 102.

Components of the data processing system 102 are discussed in further details below with respect to FIGS. 2 and 5.

Figure 2:
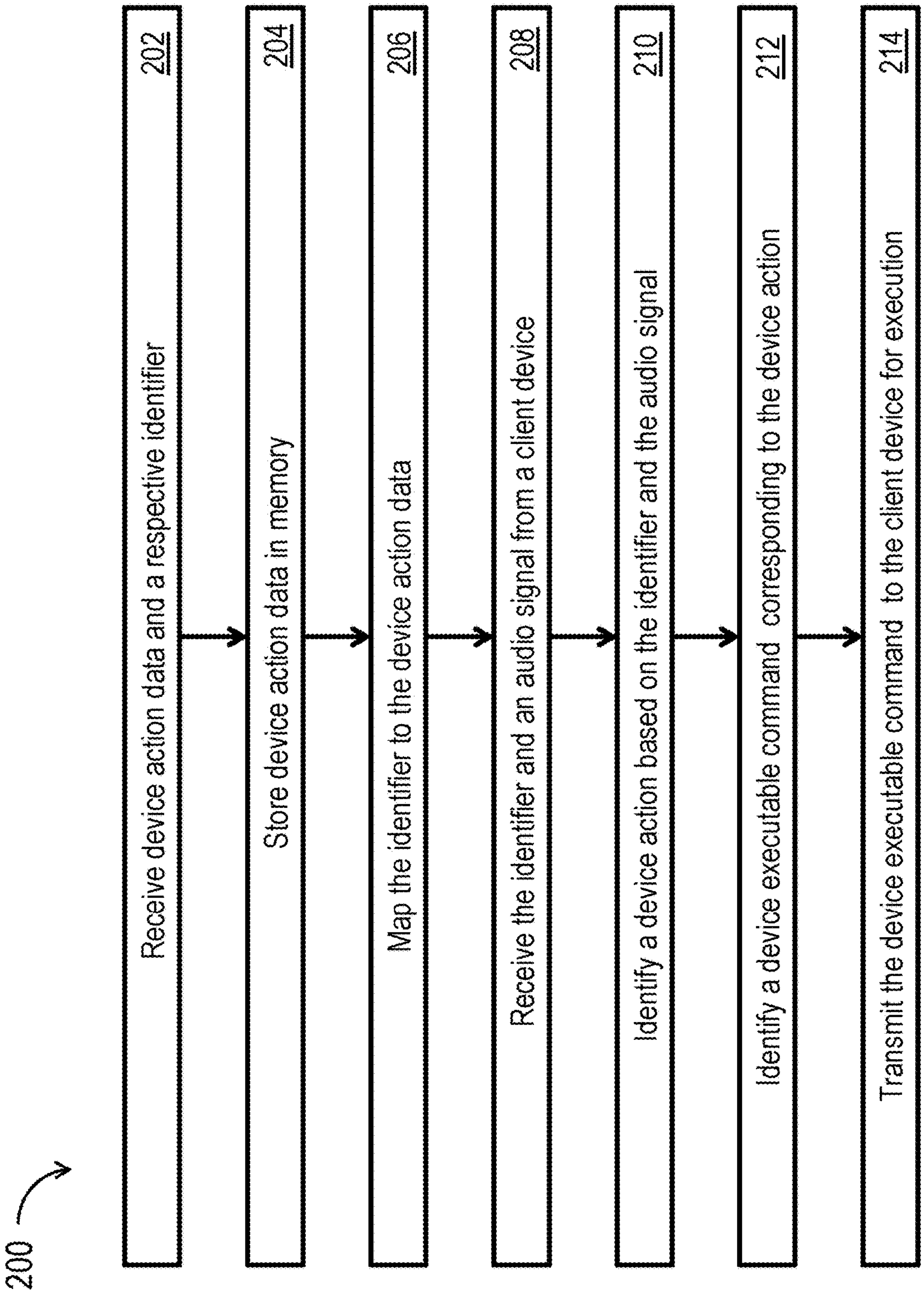
FIG. 2 illustrates a flow diagram of an example method to enable voice-based interactions in electronic devices.

FIG. 2 illustrates a flow diagram of an example method 200 to enable voice-based interactions with client (or electronic) devices. The method 200 can include receiving device action data and a respective identifier (ACT 202). The method 200 can include storing the device action data in a memory (ACT 204). The method 200 can include mapping the identifier to the device actions data (ACT 206). The method 200 can include receiving the identifier and an audio signal from a client device (ACT 208). The method 200 can include identifying a device action based on the identifier and the audio signal (ACT 210). The method 200 can include identifying a device executable command corresponding to the device action (ACT 212). The method 200 can include transmitting the device executable command to the client device (ACT 214).

Referring to FIGS. 1 and 2, the method 200 can include the data processing system 102 receiving device action data and a corresponding identifier from a corresponding computing device 108 (ACT 202). The computing device 108 can be associated with a second-party device provider or a third-party application provider. The identifier can include a device model ID (e.g., a device model name, a device model code, or combination thereof), a device type ID, a project ID, a directory ID, an application ID, an action package ID, a provider ID, or a combination thereof. A project ID can identify a project of enabling a set of second-party devices or a third-party application with voice-based interaction. The project can refer to a collection of software tools and/or data provided by a second-party device provider or a third-party application provider to the data processing system 102. The directory ID can identify a directory used by the data processing system 102 to store the action data. The device action data can include indications of a plurality of device actions supported by second-party devices (e.g., associated with the device model ID or the device type ID) or by a third-party application (e.g., associated with the application ID or project ID). The device action data can also include a plurality of device executable commands. Each device executable command of the plurality of device executable commands can be associated with a corresponding device action of the plurality of device actions. For each device action, the corresponding device executable command can trigger execution of the device action on one or more client devices 104. The data processing system 102 can also receive information including an indication of a device type, an identifier or name of a second-party device provider, an identifier or name of a third-party application provider, a description of the device model or corresponding second-party devices, a description of the third-party application, a version of third-party application, or a combination thereof.

The communications interface 114 may also receive a plurality of responses for presentation by the client devices 104 in connection with execution of the device actions. Each response of the plurality of responses can be associated with a corresponding device action and can be provided to a client device 104 for presentation in connection with execution of the corresponding device action. For instance, a response can be played by the client device 104 in audio form to announce to the user the start of, current, or completion of, execution of the corresponding device action.

The method 200 can include storing the device action data in a memory (ACT 204). The memory 110 or the device action customization component 120 can allocate the data repository 116 for storing device action data for various device models, various third-party applications, or a combination thereof. The device action customization component 120 can store the device action data associated with separate device models or with separate third-party applications separately, for example, as separate action packages 118. Each action package 118 can include one or more corresponding data structures, one or more corresponding data files, or a combination thereof listing a plurality of device actions and the corresponding device executable commands associated with, for example, a device model or a third-party application.

The method 200 can include mapping the identifier with the device actions data (ACT 206). The device action customization component 114 can arrange the device action data such that the identifier is mapped or linked to each of the plurality of device actions in the corresponding action package 118. For instance, the action package 118, as stored by the data processing system 102, can be identified by the corresponding identifier. For example, the device action customization component 114 can assign to the action package 118 a name including the identifier, or can store the action package 118 in a directory with a name including the identifier. The device action customization component 114 may also map or link each device action to the corresponding device executable command. The device action customization component 114 may also map or link each device action to the corresponding response, if any. For example, the device action customization component 114 may store the device actions, the device executable commands, and the responses in a table with each device action sharing the same row (or same column) with the corresponding device executable command and the corresponding response.

For second-party devices associated with a device model, the device action customization component 114 may also validate or certify the device model prior to serving second-party devices associated with that device model. For example, upon successful testing of the device executable commands (e.g., on a prototype or actual second-party device), the device action customization component 114 may validate or certify the device model by setting (or creating a parameter) in the corresponding action package 118 to indicate that the action package 118 is active. Second-party devices associated with non-active action packages may not be served by the data processing system 102.

The method 200 can include receiving the identifier and an audio signal from a client device (ACT 208). The communications interface 114 can receive, from a client device 104 (e.g., associated with an action package 118), an audio signal and the identifier responsive to a voice-based query from a user of the client device 104. For example, for a second-party device, a respective user may make a voice-based query to the second-party device, which in turn can record the audio signal corresponding to the query and send it with the identifier to the data processing system 102. For a third-party application, the application can provide an interactive UI component for initiating a conversation with the client device 104 on which the application is installed. Upon interacting with the interactive UI component, the application can cause the client device 104 to, for example, activate an audio receiver (e.g., a microphone), establish a communications session with the data processing system 102, or both. When the user makes a voice-based query, the application can cause the client device 104 to record the audio signal representing the query and send the audio signal with the identifier to the data processing system 102. The client device 104 can specify another audio source, different from the audio receiver, from which to receive audio input for sending to the data processing system 102.

The method 200 can include identifying a device action based on the identifier and the audio signal (ACT 210). The device action customization component 120 can use the received identifier to identify the corresponding action package 118 among the action packages 118 maintained by (or accessible to) the data processing system 102. The device action customization component 120 can retrieve the query pattern(s) associated with each of the device actions listed in the action package 118. The speech recognition component 122 can convert the audio signal into corresponding text. The NLP component 122 can identify, using the text generated by the speech recognition component 122 and the retrieved query patterns, a device action of the plurality of device actions listed in the action package associated with the identifier. The NLP component 124 can apply a bias for the retrieved query patterns when matching the text generated by speech recognition component to corresponding meaning. For instance, given that the received audio signal is known to be provided by a second-party device or a third-party application associated with the identifier or the corresponding action package 118, the NLP component 124 can assign zero-matching-weights or relatively small matching weights to meanings not corresponding to the query patterns listed in the action package 118 (e.g., compared to matching weights for meanings corresponding to the query patterns in the action package 118). The NLP component 124 can determine a matching score (e.g., based on the matching weights) for each device action (or corresponding query pattern(s)) using machine learning processes of the NLP component 124. The NLP component 124 can select the device action with the highest weight as the one matching the content of the received audio signal.

The method 200 can include identifying a device executable command corresponding to the device actin (ACT 212). The device action customization component 120 can identify (or retrieve) a device executable command, of the plurality of device executable commands in the action package 118, corresponding to the device action identified by the NLP component 124. For instance, the device action customization component 120 can retrieve the device executable action mapped or linked to the device action (identified by the NLP component 124) in the action package 118. The device action customization component 120 may also identify one or more parameters associated with the device executable command. For example, if the device action (or the corresponding device executable command) relates to a request for driving directions or a request for a ride, the corresponding parameters may include indications of the start and destination locations. If the device action relates to opening a resource information (e.g., a social network page or a web page), the parameter(s) can include a name or an address of the resource. For each device action, the corresponding query pattern(s) can indicate if the device action is associated with any input parameters. For example, the query "need ride from LOCATION1 to LOCATION2" indicates that the parameter LOCATION1 and LOCATION2 are to be provided by the user of the client device 104. Also, in the query patterns "open FRIEND page," "go with RIDE," "show me FACILITIES," and "comment to POST with CONTENT," the parameters FRIEND, RIDE, FACILITIES, POST and CONTENT are to be provided by the user. The NLP component 124 can parse the text corresponding to the received audio signal and identify the values of device action parameters, if any. The device action customization component 120 can attach the identified parameters to the device executable command corresponding to the device action before sending the device executable command to the client device 104.

The device action customization component 120 may also retrieve a response mapped or linked to the device action (identified by the NLP component 124) in the corresponding action package 118. The audio signal generator 126 can convert the response to audio format (e.g., an audio signal) if the response is originally in textual format. If the response is associated with the device action is in audio, visual, or audiovisual format, the device action customization component 120 can provide the response to the communications interface 114 for sending to the second-party device 104.

The method 200 can include transmitting the device executable command to the second-party device (ACT 214). The communications interface 114 can transmit, to the client device 104, the device executable command, with corresponding parameters if any, for execution responsive to the voice-based query. The executable command, when executed, can cause the client device 104 to perform the device action identified by the NLP component 124. The communications interface 114 may also transmit the response (in audio, visual, or audiovisual format), if any, to the client device 104 for rendering.

Figure 3:
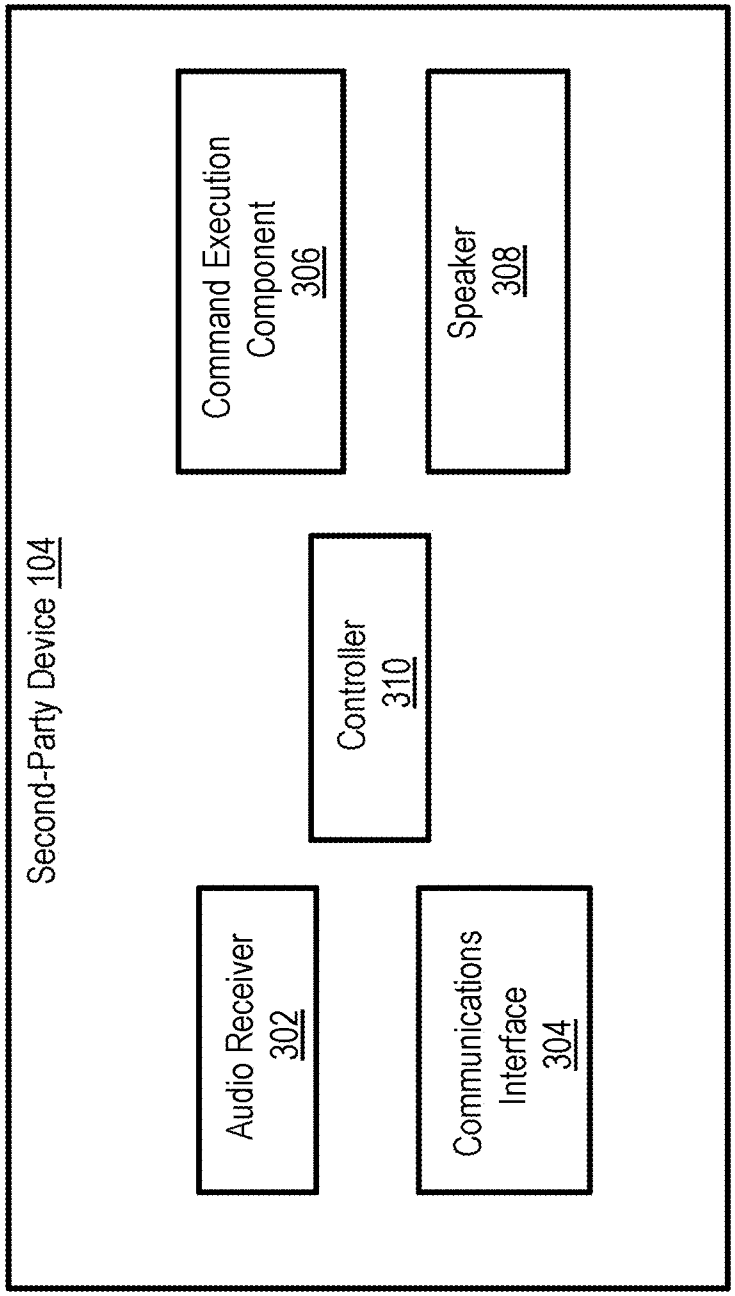
FIG. 3 illustrates a block diagram of an electronic device supporting voice-based interactions.

FIG. 3 illustrates a block diagram of a client (or electronic) device 104 that supports voice-based interactions. The client device 104 can include an audio receiver 302 to receive voice-based queries, and a communications interface 304 to communicate with other devices or systems, such as the data processing system 102. The client device 104 can include a command execution component 306 to execute (or cause execution of) device executable commands, and a speaker 308 to generate audio waves based on audio signals (e.g., audio signals received from the data processing system 102). The client device 104 can include a controller 310 to manage communications with the data processing system 102. These components of the second-party device are further discussed with regard to FIG. 4 below.

Figure 4:
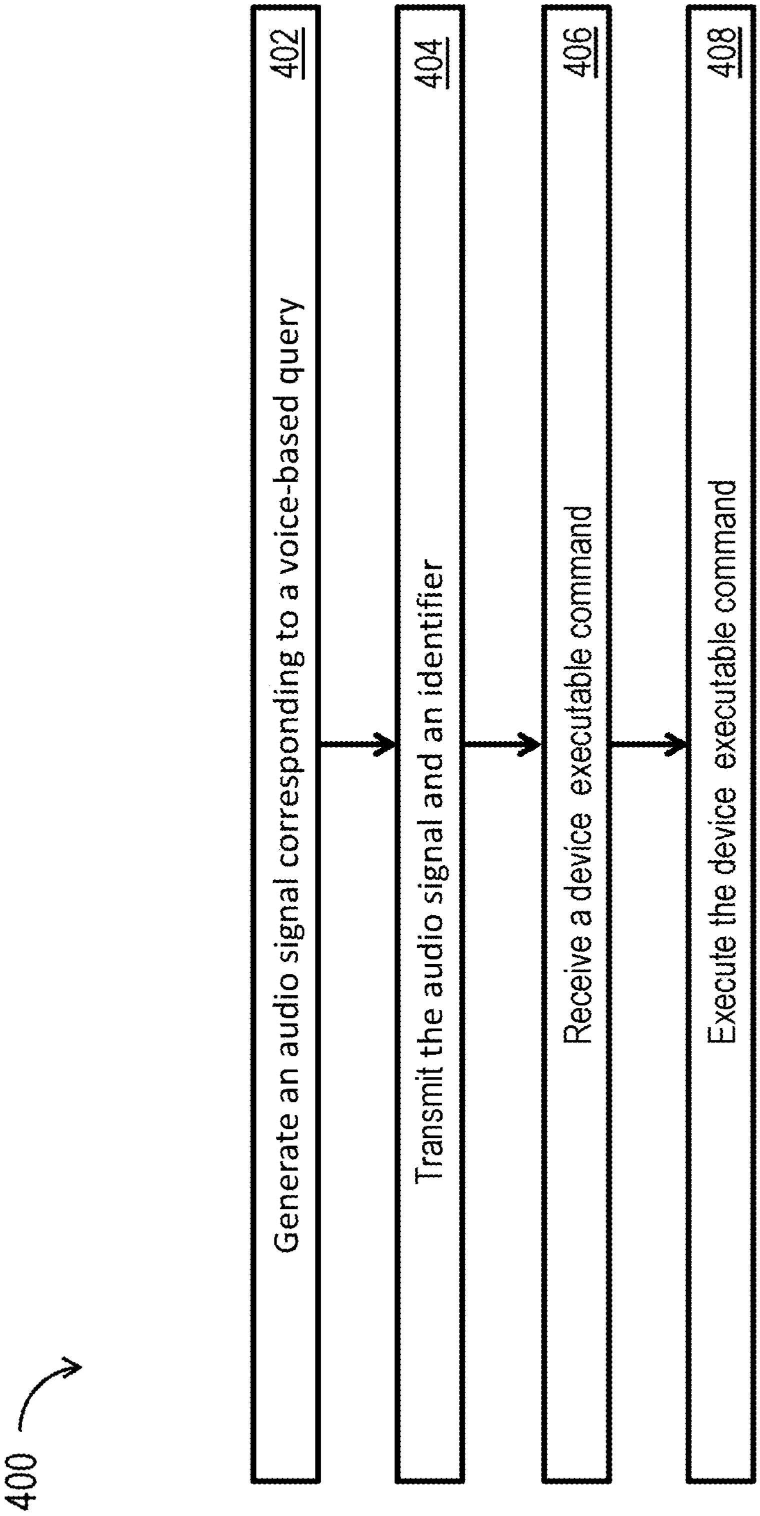
FIG. 4 illustrates a flow diagram of an example method of enabling electronic devices to support voice-based interactions.

FIG. 4 illustrates a flow diagram of an example method 400 of enabling client devices to support voice-based interactions. The method 400 can include generating and audio signal responsive to a voice-based query (ACT 402). The method 400 can include transmitting the radio signal and an identifier to a remote data processing system (ACT 404). The method 400 can include receiving a device executable command (ACT 406), and executing the device executable command (ACT 408).

Referring to FIGS. 3 and 4, the method 400 can include generating and audio signal responsive to a voice-based query (ACT 402). A user of the client device 104 can initiate a conversation with the client device or a third-party application installed thereon. The client device 104 or the third-party application may provide an interactive UI component, a button, or other input mechanism for signaling to the client device 104 the user's intent to start a conversation. Upon interaction with the interactive UI component (or upon other input), the client device 104 or the third-party application may actuate the audio receiver 302 (e.g., a microphone) to record audio input, establish a communication session with the data processing system 102, or both. The audio receiver 302 can generate an audio signal corresponding to a voice-based query from the user of the client device 104. The audio receiver 302 can, for instance, convert a sound wave corresponding to the voice-based query to an electric audio signal. The client device 104 can also store (e.g., in a corresponding memory) an identifier (e.g., device model ID, application ID, project ID, directory ID, or a combination thereof) associated with an action package defining device actions supported by the client device 104 or the third-party application. The client device 104 (or the third-party application) can specify another audio source, different from the audio receiver, from which to receive audio input for sending to the data processing system 102. The client device 104 or the third-party application may actuate the specified audio source upon interaction with the interactive UI component.

The method 400 can include transmitting the identifier and the radio signal to a remote data processing system (ACT 404). The controller 310 can cause the communications interface 304 to transmit, responsive to the voice-based query, the identifier and the audio signal to the data processing system 102. The controller 310 can generate a request, for sending to the data processing system 102, including the audio signal and the identifier. The request can be viewed as a request for interpreting the content of the voice-based query. The controller 310 can cause the communications interface 304 to transmit the request to the data processing system 102. As discussed above with regard to FIGS. 1 and 2, the data processing system 102 can use the identifier to identify an action package 118, among a plurality of action packages 118 maintained by the data processing system, and use the audio signal to determine a device action (or corresponding query pattern(s)), among device actions or query patterns listed in the action package 118, that corresponds to content of the voice-based query. The data processing system 102 can determine a device executable command corresponding to the device action, if any, matched to content of the audio signal.

The method 400 can include receiving a device executable command (ACT 406). The communications interface 304 can receive, from the data processing system, responsive to transmission of the audio signal and the identifier, a response message including the device executable command corresponding to the device action matched to content of the audio signal. The device executable command can be identified by the data processing system 102 upon identifying a device action corresponding to content of the voice-based query (or the audio signal). Receiving the device executable command can include receiving (e.g., in the response message) one or more parameters associated with the command and provided by the user in the voice-based query. The communications interface 304 may also receive an audio response from the data processing system 102. The controller 310 can parse the received message to identify the device executable command, any parameters associated with command, media response to be rendered by the client device 104, or a combination thereof.

The method 400 can include executing the device executable command (ACT 408). The controller 310 can provide the device executable command and any parameters thereof to the command execution component 306 for execution. The command execution component 306 can execute the device executable command to cause the client device 104 to perform the device action corresponding to the received device executable command. Executing the command can include the client device 104 (or the application stored thereon) generating and a sending a search query (or request) to an online server (e.g., a server associated with the third-party application). For example, the application or the client device 104 can generate a request for a ride from a first location to a second location based on the received executable command and corresponding parameters. The client device 104 can transmit the search query or request to the online server. Upon receiving a response from the online server, the client device 104 can present information in the response to the user.

The controller 310 or the command executable component 306 can include (or implement) a device action handler to extract the device executable command and any corresponding parameters from communications (or messages) received from the data processing system 102, and execute the extracted command. The script below represents an example illustration of a device action handler.

```
.h
namespace assistant_client {
class SmartCookerHandler : public DeviceActionHandler {
public:
void Execute(const std::string& request_json) override;
};
}
.cc
namespace assistant_client {
  void SmartCookerHandler::Execute(const std::string& device_
  request_json) {
  // Extract the command
  // Start cake cooking
   }
}
==============================================
namespace chromecast {
// static
assistant_client::DeviceActionHandler*
CastAssistantShlib::CreateDeviceActionHandler(const
std:: string& action_type) {
  if (action_type == "device_control") {
  return new assistant_client: : SmartCookerHandler( );
 }
}}
// namespace chromecast
```

The controller 310 can provide any media response for rendering by the client device 104 to a corresponding media player. For example, the controller 310 can provide an audio response received from the data processing system 102 to an audio player for playing the audio response through the speaker 308 in connection with execution of the device executable command. The controller 310 can cause the rendering of the audio response prior to, during, or after execution of the device executable command. The audio player and the speaker may also play any additional audio content received from the data processing system 102. If a visual or audiovisual response is received, the controller can cause an audio visual player (e.g., image, animation or video player) to render the visual or audiovisual response on a display of the client device 104.

The action packages, the device actions and the corresponding device executable commands described with regard to FIGS. 3 and 4 are similar to those described with regard to FIGS. 1 and 2 above. Also, while the description of FIGS. 3 and 4 focuses on processes and acts performed by the client device 104, these processes and acts are inter-related with processes and acts performed by the data processing system 102 and described with respect to FIGS. 1 and 2.

Figure 5:
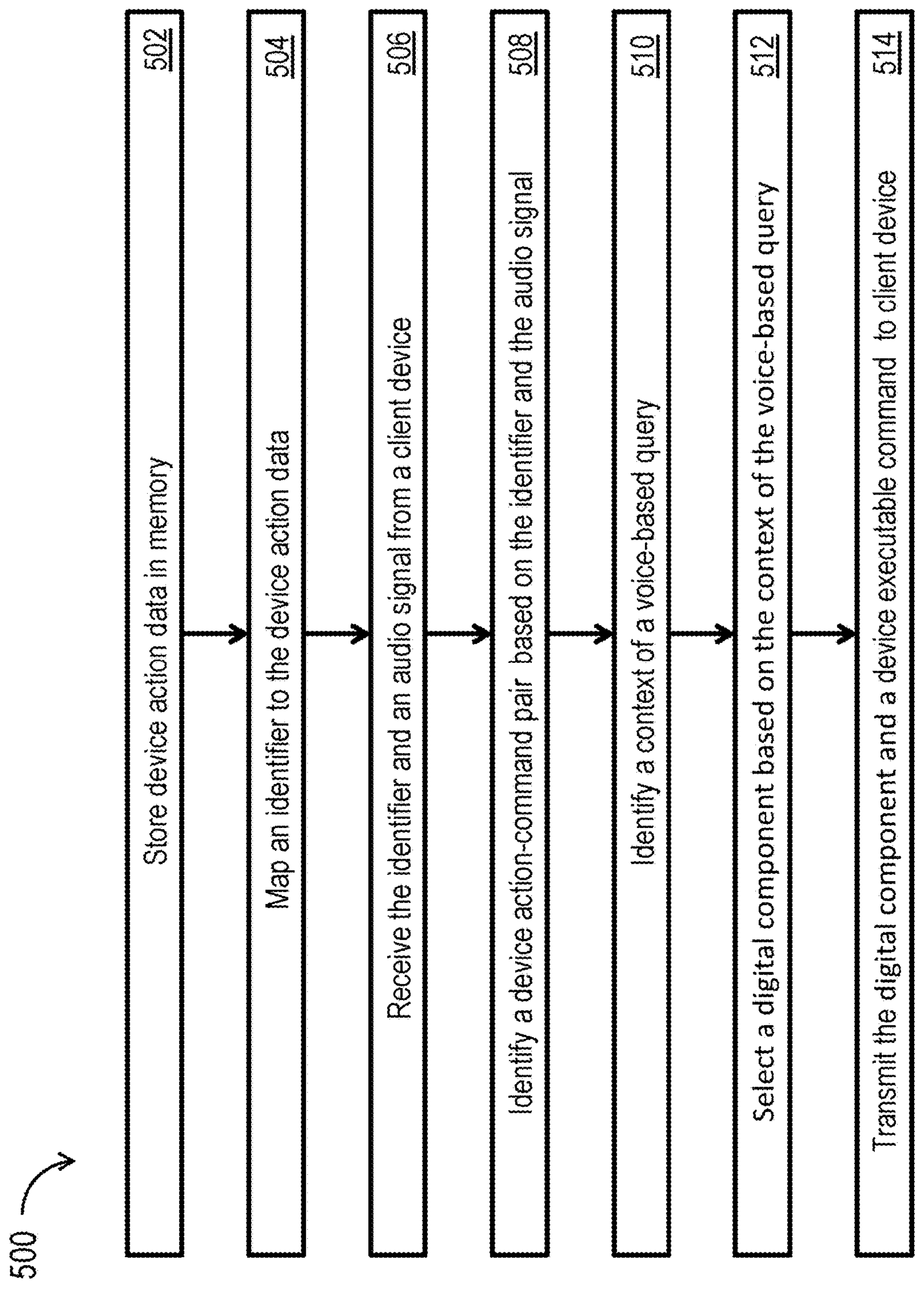
FIG. 5 illustrates a flow diagram of an example method of providing content to electronic devices responsive to voice-based interactions.

FIG. 5 illustrates a flow diagram of an example method 500 of providing content responsive to voice-based interactions for triggering device actions. The method 500 can include storing, in a memory, device action data (ACT 502). The method 500 can include mapping an identifier to the device action data (ACT 504). The method 500 can include receiving the identifier and an audio signal from a client device (ACT 506). The method 500 can include identifying a device action-command pair based on the identifier and the audio signal (ACT 508). The method 500 can include identifying a context of a voice-based query associated with the audio signal (ACT 510). The method 500 can include selecting a digital component based on the context of the voice-based query associated with the audio signal (ACT 512). The method 500 can include transmitting the digital component and a device executable command corresponding to the device action-command pair to the client device 104 (ACT 514).

The data processing system 102 (or components thereof) can perform the ACTS 502-508 of method 500 in a similar way as discussed above with regard to FIGS. 1 and 2 (similar to ACTS 202-208 of FIG. 2). The device action data can include a device action package 118 defining, for example, custom device actions supported by second-party devices associated with device model or by a third-party application installed (or capable of running) on one or more client devices 104.

The method 500 can include identifying a context of a voice-based query associated with the audio signal (ACT 510). The action customization component 120 can determine the context of the voice-based query corresponding to the received audio signal based on, for example, factors associated with content of the audio signal, content of the action package 118 (or device action data) associated with the identifier, or both. For instance, each device action in the action package 118 (or device action data) associated with the identifier can be associated with one or more keywords (e.g., provided by the second-party device provider or the third-party application provider, or generated by the data processing system based on collected historical data). The keywords can be indicative of a common context of queries matched to that device action. The action customization component 120 can use the keywords associated with device action as describing the context of the device action.

The action customization component 120 can identify a context (or attributes thereof) of the voice-based query based on information associated with the action package, for example, describing second-party devices associated with a device model (e.g., if the identifier is a device model ID) or describing a third-party application associated with the action package. For instance, if the application is a gaming application, a context (or a context attribute) of the voice-based query would be gaming. Also, if the second-party device is a fitness device, a context (or a context attribute) of the voice-based query would be fitness or exercising.

The action customization component 120 can identify a context (or attributes thereof) of the voice-based query based on information associated with the action package, for example, describing second-party devices associated with a device model (e.g., if the identifier is a device model ID) or describing a third-party application associated with the action package. For instance, if the application is a gaming application, a context (or a context attribute) of the voice-based query would be gaming. Also, if the second-party device is a fitness device, a context (or a context attribute) of the voice-based query would be fitness or exercising.

The action customization component 120 can identify a context (or attributes thereof) of the voice-based query based on information (or parameters) provided in the voice-based query and extracted by the NLP component 124. For example, the action customization component 120 can use extracted parameters indicative of geographical locations to determine a geographical context of the voice-based query. The action customization component 120 can use extracted parameters indicative of type of business (e.g., gas stations or restaurants) to determine a user intent (e.g., filling gas or eating).

The device action customization component 120 can map the device action identified by the NLP component 124 to one or more predefined corresponding sequences of device actions. For instance, the device action customization component 120 can collect statistical data (e.g., recurrence or frequency) of sequences of device actions requested by users of the second-party devices associated with a device model or users of a third-party application. Given the identified device action, the device action customization component 120 can determine one or more most likely device action sequences including the identified device action. The device action customization component 120 can identify (or predict) one or more other devices actions to follow the identified device action. For example, for a smart TV or a cable box, if the currently identified action is an action to switch to on-demand channel, then the following device actions to be requested most likely include requesting a movie listing or on-demand content listing, and ordering a movie or media content for streaming. The context, in this case, can be, for example, "movie streaming" or "entertainment content streaming."

The action customization component 120 can use a combination of various factors to identify the context of the voice-based query. For example, the action customization component 120 can use any combination of device or application descriptions, parameters extracted from the voice-based content, keywords associated with query patterns in the action package 118. The action customization component 120 can employ data collected over time and machine learning methods to expand the factors (or information) used for determining the context of voice-based queries.

The method 500 can include selecting a digital component based on the context of a voice-based query associated with the audio signal (ACT 512). The content selector component 128 can use keywords (or attributes) describing the context of the voice-based query to select one or more digital components (or content items). For example, the content selector component 128 can select a digital component (e.g., ad) related to movies (or other media content) for streaming upon determining that the context relates to media content streaming. The content selector component 128 can run an auction or send a request including the keywords associated with the context to a content delivery system in selecting the digital component. The content selector component 128 can cause the audio signal generator or other components of the data processing system 102 to convert the digital component from a first format to a second format (e.g., from text to audio). For example, the content selector component 128 or the device action customization component 120 can format the digital component as an audio extension to an audio response associated with the identified device action. In such case, the digital component can be perceived (by the user of the client device 103) as being part of the audio response.

The method 500 can include transmitting the digital component and a device executable command corresponding to the device action-command pair to the client device (ACT 512). The communications interface 114 can send the device executable command (with any corresponding parameters), the digital component, and the response (if present) to the second-party device 104. The client device 104 can execute the device executable command, for example, as discussed with regard to FIG. 4 above, and play (or present) the response and/or the digital component to the user.

While in the description of FIGS. 1-5 describer the identifier as being provided by a second-party device provider or a third-party application provider, other embodiments contemplated by the current disclosure include the data processing system 102 providing generating and providing the identifier to the second-party device provider or the third-party application provider responsive to upload of respective device action data. The data processing system can assign or map the generated identifier to the device action data.

Figure 6:
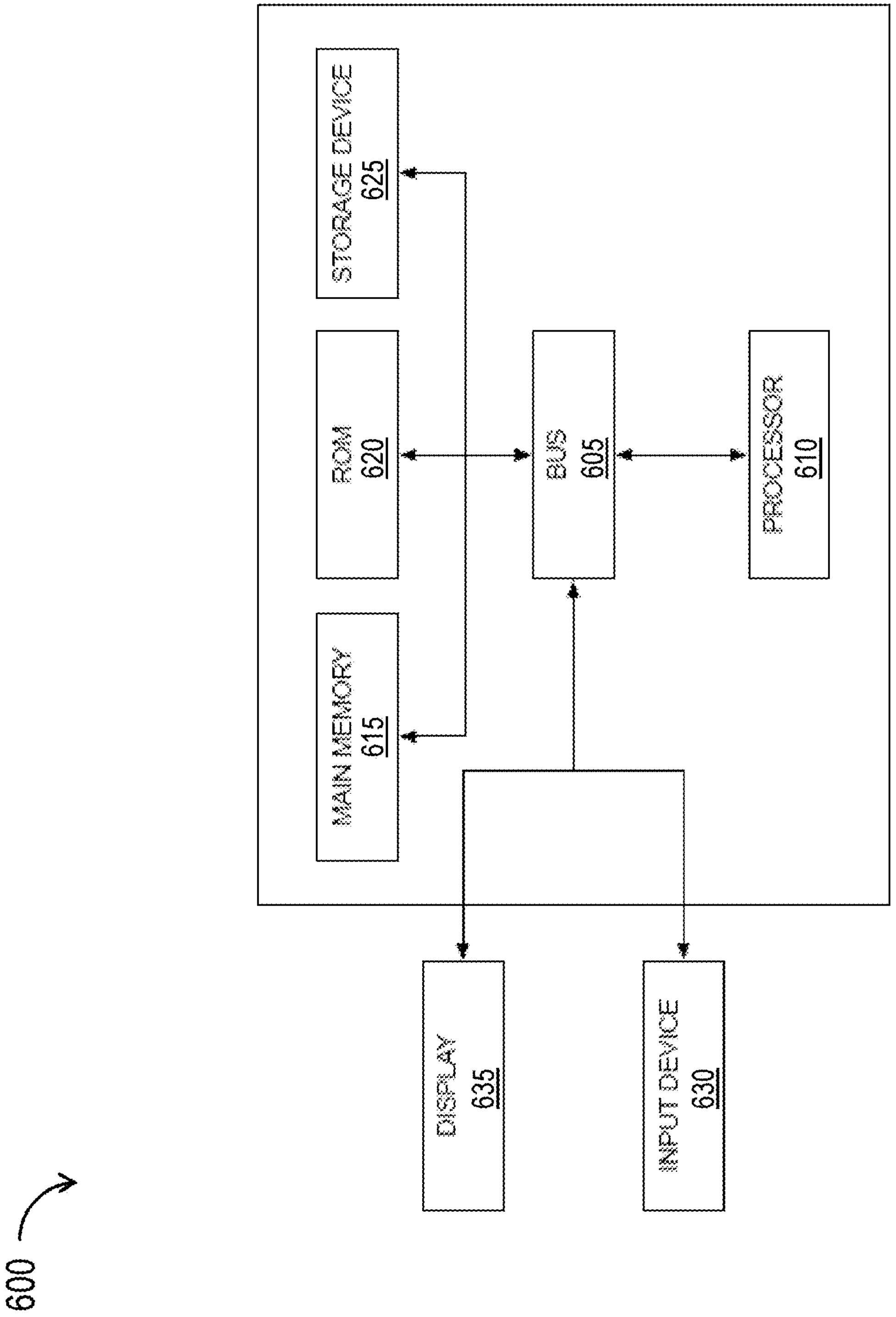
FIG. 6 is a block diagram illustrating a general architecture for a computer system that may be employed to implement elements of the systems and methods described and illustrated herein.

FIG. 6 is a block diagram of an example computer system 600. The computer system or computing device 600 can include or be used to implement the system 100 or its components such as the data processing system 102 (or devices or components thereof), the client devices 104, or the device provider computing device 108. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 400 also includes main memory 615, such as a random access memory (RAM) or other dynamic storage device, coupled to the bus 605 for storing information, and instructions to be executed by the processor 610. The main memory 615 can be or include the data repository 116. The main memory 615 can also be used for storing temporary variables, or other intermediate information during execution of instructions by the processor 610. The computing system 600 may further include a read only memory (ROM) 620 or other static storage device coupled to the bus 405 for storing static information and instructions for the processor 610. A storage device 625, such as a solid state device, magnetic disk or optical disk, can be coupled to the bus 605 to persistently store information and instructions. The storage device 625 can include or be part of the data repository 122.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information and command selections to the processor 610. The input device 430 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the data processing system 102, the client computing device 104 or other component of FIG. 1, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The device action customization component 120, speech recognition component 122, NLP component 124, audio signal generator component 126, or the content selector component 128 of the data processing system 102 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such described herein can include clients and servers. A client and server are generally remote from each other and typically interact through a communication network (e.g., the network 106). The relationship of client and server arises by virtue of computer programs running on the respective computers and having a client-server relationship to each other. In some implementations, a server transmits data (e.g., data packets representing a digital component) to a client computing device (e.g., for purposes of displaying data to and receiving user input from a user interacting with the client computing device). Data generated at the client computing device (e.g., a result of the user interaction) can be received from the client computing device at the server (e.g., received by the data processing system 102 or a server thereof).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, any combination of the device action customization component 120, speech recognition component 122, NLP component 124, audio signal generator component 126, and the content selector component 128 can be a single component, application, program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A data processing system to enable voice-based interactions with client devices, comprising:

a communications interface to receive, from a client device of a plurality of client devices associated with a device model, an audio signal and a device model identifier defining the device model, the audio signal obtained by the client device responsive to a voice-based query;

a natural language processor component to identify, using the device model identifier and content associated with the audio signal, a device action of a plurality of device actions supported by the plurality of client devices associated with the device model;

a device action customization component to identify a device executable command corresponding to the device action and to identify an audio or visual response corresponding to the device action; and the communications interface to transmit, to the client device, the device executable command for execution responsive to the voice-based query to cause performance of the device action and to transmit, to the client device, the audio or visual response for rendering on the client device in connection with and based on the device action.

2. The data processing system of claim 1, comprising:

a speech recognition component to convert the audio signal received from the client device into a corresponding text, the natural language processor component identifying the device action using the corresponding text.

3. The data processing system of claim 1, comprising the natural language processor component to:

determine, for each device action of the plurality of device actions, a corresponding weight value for matching the content of the received audio signal with the first device action; and identify the device action based on the weight values.

4. The data processing system of claim 1, comprising:

the device action customization component to validate the device model prior to interacting with the plurality of client devices associated with the device model and upon successful testing of each of a plurality of device executable commands that are supported by the plurality of client devices associated with the device model.

5. The data processing system of claim 1, comprising:

the device action customization component to provide a user interface to allow a computing device to provide the device model identifier and device action data indicative of the plurality of device actions supported by the plurality of client devices associated with the device model.

6. The data processing system of claim 1, comprising:

the device action customization component to provide a restful application programming interface (API) to allow transmission of the device model identifier and device action data indicative of the plurality of device actions supported by the plurality of client devices associated with the device model to the data processing system.

7. The data processing system of claim 1, wherein the device model identifier is associated with an application installed on the plurality of client devices, the plurality of device actions are device actions supported by the application, and the device executable command is an executable command specific to the application.

8. The data processing system of claim 7, comprising: the device action customization component to identify one or more parameters associated with the device executable command; and the communications interface to transmit, to the client device, the one or more parameters.

9. A method of enabling voice-based interactions with client devices, the method comprising:
receiving, from a client device of a plurality of client devices associated with a device model, an audio signal and a device model identifier defining the device model, the audio signal obtained by the client device responsive to a voice-based query;
identifying, using the device model identifier and content associated with the audio signal, a device action of a plurality of device actions supported by the plurality of client devices associated with the device model;
identifying a device executable command corresponding to the device action, and identifying an audio or visual response corresponding to the device action; and
transmitting, to the client device, the device executable command for execution responsive to the voice-based query to cause performance of the device action, and transmitting, to the client device, the audio or visual response for rendering on the client device in connection with and based on the device action.

10. The method of claim 9, comprising: converting the audio signal received from the client device into a corresponding text, a natural language processor component identifying the device action using the corresponding text.

11. The method of claim 9, comprising:
determining, for each first device action of the plurality of device actions, a corresponding weight value for matching the content of the received audio signal with the device action; and
identifying the device action based on the weight values.

12. The method of claim 9, comprising: validating the device model prior to interacting with the plurality of client devices associated with the device model and upon successful testing of each of a plurality of device executable commands that are supported by the plurality of client devices associated with the device model.

13. The method of claim 9, comprising: providing a user interface to allow a computing device to provide the device model identifier and device action data indicative of the plurality of device actions supported by the plurality of client devices associated with the device model.

14. The method of claim 9, comprising: the device action customization component to provide a restful application programming interface (API) for use by a computing device to transmit the device model identifier and device action data indicative of the plurality of device actions supported by the plurality of client devices associated with the device model.

15. The method of claim 9, wherein the device model identifier is associated with an application installed on the plurality of client devices, the plurality of device actions are device actions supported by the application, and the device executable command is an executable command specific to the application.

16. The method of claim 15, comprising:
identifying one or more parameters associated with the device executable command; and
transmitting, to the client device, the one or more parameters.

17. The method of claim 9, wherein the transmitting, to the client device, the device executable command comprises transmitting the device executable command in a JSON response provided to the client device.

18. The method of claim 9, wherein the transmitting, to the client device, the audio or visual response comprises transmitting, to the client device, the audio or visual response to be rendered by the client device by converting a text expression to audio.

19. A non-transitory computer-readable storage medium storing instructions that, when executed by at least one processor, cause the at least one processor to be operable to perform operations, the operations comprising:
receiving, from a client device of a plurality of client devices associated with a device model, an audio signal and a device model identifier defining the device model, the audio signal obtained by the client device responsive to a voice-based query;
identifying, using the device model identifier and content associated with the audio signal, a device action of a plurality of device actions supported by the plurality of client devices associated with the device model;
identifying a device executable command corresponding to the device action, and identifying an audio or visual response corresponding to the device action; and
transmitting, to the client device, the device executable command for execution responsive to the voice-based query to cause performance of the device action, and transmitting, to the client device, the audio or visual response for rendering on the client device in connection with and based on the device action.

* * * * *